United States Patent
Wu et al.

(10) Patent No.: US 11,825,371 B2
(45) Date of Patent: Nov. 21, 2023

(54) METHOD AND APPARATUS FOR DISTRIBUTING TRAFFIC LOAD BETWEEN DIFFERENT COMMUNICATION CELLS

(71) Applicant: SAMSUNG ELECTRONICS CO., LTD., Suwon-si (KR)

(72) Inventors: Di Wu, Montreal (CA); Jikun Kang, Montreal (CA); Yi Tian Xu, Montreal (CA); Jimmy Li, Montreal (CA); Michael Jenkin, Toronto (CA); Xue Liu, Montreal (CA); Xi Chen, Montreal (CA); Gregory Lewis Dudek, Montreal (CA); Intaik Park, Seoul (KR); Taeseop Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 17/334,018

(22) Filed: May 28, 2021

(65) Prior Publication Data

US 2022/0150785 A1    May 12, 2022

Related U.S. Application Data

(60) Provisional application No. 63/112,421, filed on Nov. 11, 2020.

(51) Int. Cl.
*H04W 36/22* (2009.01)
*H04W 36/08* (2009.01)
(Continued)

(52) U.S. Cl.
CPC ............ *H04W 36/22* (2013.01); *G06N 3/045* (2023.01); *G06N 3/08* (2013.01); *G06N 20/00* (2019.01); *H04W 36/08* (2013.01); *H04W 48/06* (2013.01)

(58) Field of Classification Search
CPC ..... H04W 36/22; H04W 36/08; H04W 48/06; H04W 24/02; H04W 48/20; G06N 3/045;
(Continued)

(56) References Cited

U.S. PATENT DOCUMENTS 10,390,261 B2 *   8/2019  Yiu ........................ H04W 36/26
2005/0176440 A1 * 8/2005  Sang ..................... H04W 36/22
                                                                455/453

(Continued)

FOREIGN PATENT DOCUMENTS

WO     2019/114959 A1    6/2019
WO     WO-2019114959 A1 * 6/2019 ........... G06K 9/6262

OTHER PUBLICATIONS

"Hierarchical Policy Learning for Hybrid Communication Load Balancing"; Kang et al.; ICC 2021—IEEE International Conference on Communications; (Year: 2021).*

(Continued)

*Primary Examiner* — Benjamin H Elliott, IV
(74) *Attorney, Agent, or Firm* — Sughrue Mion, PLLC

(57) ABSTRACT

An apparatus distributing communication load over a plurality of communication cells may select action centers from random cell reselection values, based on a standard deviation of an internet protocol (IP) throughout over the plurality of communication cells; input a first vector indicating a communication state of a communication system and a second vector indicating the standard deviation of the IP throughout of the plurality of communication cells, to a neural network to output a sum of the action centers and offsets as cell reselection parameters; and transmit the cell reselection parameters to the communication system to enable a base station of the communication system to perform a cell reselection based on the cell reselection parameters.

16 Claims, 10 Drawing Sheets

(51) Int. Cl.
*G06N 3/08* (2023.01)
*G06N 20/00* (2019.01)
*H04W 48/06* (2009.01)
*G06N 3/045* (2023.01)

(58) Field of Classification Search
CPC ............ G06N 3/08; G06N 20/00; G06N 7/01; G06N 3/088; G06N 3/006
See application file for complete search history.

(56) References Cited

U.S. PATENT DOCUMENTS

| | | | |
|---|---|---|---|
| 2013/0021962 A1* | 1/2013 | Hu | H04W 28/0808 370/315 |
| 2017/0118678 A1* | 4/2017 | Brisebois | H04W 48/08 |
| 2017/0289849 A1* | 10/2017 | Yiu | H04W 36/06 |
| 2019/0014487 A1* | 1/2019 | Yang | G06N 3/084 |
| 2019/0014488 A1* | 1/2019 | Tan | G06N 3/044 |
| 2019/0026639 A1* | 1/2019 | Vasudevan | G06N 3/08 |
| 2019/0319868 A1* | 10/2019 | Svennebring | H04W 24/08 |
| 2020/0267217 A1* | 8/2020 | Defiebre | H04L 69/24 |
| 2021/0258866 A1* | 8/2021 | Chou | H04W 48/16 |
| 2022/0150785 A1* | 5/2022 | Wu | G06N 7/01 |
| 2023/0051540 A1* | 2/2023 | Sui | H04W 36/0061 |

OTHER PUBLICATIONS

International Search Report for PCT/KR2021/015939; dated Feb. 8, 2022 (Year: 2022).*
"SMig-RL: An Evolutionary Migration Framework for Cloud Services Based on Deep Reinforcement Learning"; Ren et al.; ACM Transactions on Internet Technology, vol. 20, No. 4, Article 43. Publication date: Oct. 2020 (Year: 2020).*
"Joint Design of Access Point Selection and Path Planning for UAV-Assisted Cellular Networks"; Zhu et al.; IEEE Internet of Things Journal, vol. 7, No. 1, Jan. 2020 (Year: 2020).*
"Mobility Load Management in Cellular Networks: A Deep Reinforcement Learning Approach"; Alsuhli et al.; IEEE Transactions on Mobile Computing, vol. 22, No. 3, Mar. 2023 (Manuscript; revised Jul. 14, 2021; accepted Aug. 17, 2021. Date of publication Aug. 30, 2021) (Year: 2023).*
"Multiobjective Load Balancing for Multiband Downlink Cellular Networks: A Meta-Reinforcement Learning Approach"; Feriani et al.; IEEE Journal on Selected Areas in Communications, vol. 40, No. 9, Sep. 2022 (Year: 2022).*

* cited by examiner

METHOD AND APPARATUS FOR DISTRIBUTING TRAFFIC LOAD BETWEEN DIFFERENT COMMUNICATION CELLS

CROSS-REFERENCE TO RELATED APPLICATION

This application claims priority under 35 U.S.C. § 119 from U.S. Provisional Application No. 63/112,421 filed on Nov. 11, 2020 in the U.S. Patent and Trademark Office, the disclosure of which is incorporated herein by reference in its entirety.

FIELD

Methods and apparatuses consistent with embodiments relate to distributing traffic load among different communication cells, and more particularly, performing traffic load balancing for idle mode user equipment (UEs) based on a reinforcement learning neural network.

BACKGROUND

The level of wireless communication traffic continues to increase year over year. With the roll out of fifth-generation (5G) systems, the amount of mobile data is expected to increase even more quickly in the future. This ongoing increase is due to the increased number of connected devices and the amount of data transmitted and consumed by these devices. Beyond the number of connected devices, with the advances in video resolution, and augmented reality (AR)- and virtual reality (VR)-based applications, the amount of wireless data associated with individual devices is anticipated to increase as well.

In 5G networks, wireless services are provided to individual user equipment (UE) through several different radio carrier frequency channels. At a given moment, a UE may be serviced by more than one cell, which is represented as a combination of a serving sector and wireless carrier frequency associated with each Evolved Node B (gNodeB) within range.

An individual UE's quality of service (QoS) and overall wireless network utilization highly depend on the nature of the assignment of UEs to the available gNodeBs and the specific carrier frequencies supported by that gNodeB. In working networks, the distribution of communication traffic may be uneven. For example, 50% of network traffic is serviced by only 15% of the cell towers. This uneven distribution results in significant system performance degradation. The allocation of UEs to the appropriate cells to optimize the network in some way, a load balancing process is crucial in current communication networks. Effective load balancing techniques may help displace the load from congested cells to less-loaded cells and serve users better. When a network is properly balanced, individual UEs may experience an improved QoS with lower latency, higher throughput, and better network reliability relative to the unbalanced case.

In the related art, there are two main categories of approaches: the rule-based methods and the reinforcement learning based approaches.

In the rule-based approach, a set of rules are designed based on prior knowledge of network performance from domain experts. Although rule-based methods may be effective, it is very difficult for a rule-based method to reach the optimal solution. Also, it is hard to quickly adapt rule-based approaches to drastic communication traffic changes in terms of both volume and type even over a limited window.

In the RL-based approach, a control agent learns a load balancing policy by interacting with a communication system. Control actions are chosen by the RL agent depending on the observation of system state. RL-based approaches offer the possibility of being more adaptive and providing a solution that is closer to the optimal solution than a static rule-based approach.

However, most existing work on load balancing focuses on implementing different load balancing algorithms for active UEs that are currently consuming network resources, but the impact of idle mode UEs has been rarely considered.

An idle mode UE is a UE that is not actively consuming network resources but receives limited communications such as paging message used to wake up the UE or broadcasting warning message (e.g., ETWS, Earthquake and Tsunami Warning System messages). Although an idle mode UE does not create substantive load on the network now, it is anticipated that eventually this UE will wake up and begin to consume more network bandwidth.

Therefore, there has been a demand for a system and a method for achieving idle mode UE-based load balancing among different communication cells, to improve system efficiency and user experience.

SUMMARY

One or more example embodiments provide a method, an apparatus, and a system for performing load balancing for idle mode UEs to re-select a cell upon which the UEs are to be camped.

According to an aspect of the disclosure, there is provided an apparatus for distributing communication load over a plurality of communication cells included in a communication system. The apparatus may include a memory storing instructions; and a processor configured to execute the instructions to: select action centers from random cell reselection values, based on a standard deviation of an internet protocol (IP) throughput over the plurality of communication cells; input a first vector indicating a communication state of the communication system and a second vector indicating the standard deviation of the IP throughput of the plurality of communication cells, to a neural network to output a sum of the action centers and offsets as cell reselection parameters; and transmit the cell reselection parameters to the communication system to enable a base station of the communication system to perform a cell reselection based on the cell reselection parameters.

The first vector may represent a number of active user equipment (UEs) per cell, a cell load ratio, and the IP throughput per cell.

The apparatus may further include: a communication interface configured to receive information of the number of active equipment (UEs) per cell, the cell load ratio, and the IP throughput per cell, from the base station of the communication system, and transmit the cell reselection parameters to the base station.

The neural network may include an actor neural network and a critic neural network that are jointly trained based on proximal policy optimization (PPO).

The apparatus may further include a buffer configured to store the communication state, the standard deviation of the IP throughput, and the cell reselection parameters as a state-action-reward tuple, and provide the state-action-reward tuple to the actor neural network.

The critic neural network may be configured to evaluate the cell reselection parameters based on the communication state and the standard deviation of the IP throughput, and output a value function representing a result of evaluating the cell reselection parameters to the actor neural network. The actor neural network may be configured to determine the offsets based on the value function.

At each time step of an application phase of the neural network, the processor may be further configured to determine an intermediate action that maximizes a probability of taking the intermediate action at the communication state of the communication system. The intermediate action may correspond to the cell reselection parameters at each time step.

The processor may be further configured to update a policy parameter indicating the cell reselection parameters that are applicable at the communication state of the communication system, based on a clipped surrogate objective function.

The cell reselection parameters that are transmitted to the communication system may correspond to new cell reselection parameters. The clipped surrogate objective function may represent an expected minimum value of a probability that previous cell reselection parameters of the communication system are updated to the new cell reselection parameters.

According to another aspect of the disclosure, there is provided a method of distributing communication load over a plurality of communication cells included in a communication system. The method may include: selecting action centers from random cell reselection values, based on a standard deviation of an internet protocol (IP) throughput over the plurality of communication cells; inputting a first vector indicating a communication state of the communication system and a second vector indicating the standard deviation of the IP throughput of the plurality of communication cells, to a neural network to output a sum of the action centers and offsets as cell reselection parameters; and transmitting the cell reselection parameters to the communication system to enable a base station of the communication system to perform a cell reselection based on the cell reselection parameters.

The first vector may represent a number of active user equipment (UEs) per cell, a cell load ratio, and the IP throughput per cell.

The method may further include: receiving information of the number of active equipment (UEs) per cell, the cell load ratio, and the IP throughput per cell, from the base station of the communication system; and transmitting the cell reselection parameters to the base station.

The neural network may include an actor neural network and a critic neural network that are jointly trained based on proximal policy optimization (PPO).

The method may further include: storing the communication state, the standard deviation of the IP throughput, and the cell reselection parameters as a state-action-reward tuple, on a buffer; and providing the state-action-reward tuple from the buffer to the actor neural network.

The critic neural network may be configured to evaluate the cell reselection parameters based on the communication state and the standard deviation of the IP throughput, and output a value function representing a result of evaluating the cell reselection parameters to the actor neural network, and the actor neural network may be configured to determine the offsets based on the value function.

The method may further include: at each time step of an application phase of the neural network, determining an intermediate action that maximizes a probability of taking the intermediate action at the communication state of the communication system. The intermediate action may correspond to the cell reselection parameters at each time step.

The method may further include updating a policy parameter indicating the cell reselection parameters that are applicable at the communication state of the communication system, based on a clipped surrogate objective function.

The cell reselection parameters may correspond to new cell reselection parameters. The clipped surrogate objective function may represent an expected minimum value of a probability that previous cell reselection parameters of the communication system are updated to the new cell reselection parameters.

According to another aspect of the disclosure, there is provided a non-transitory computer-readable storage medium storing a program that is executable by at least one processor to: select action centers from random cell reselection values, based on a standard deviation of an internet protocol (IP) throughput over a plurality of communication cells that are included in a communication system; input a first vector indicating a communication state of the communication system and a second vector indicating the standard deviation of the IP throughput of the plurality of communication cells, to a neural network to output a sum of the action centers and offsets as cell reselection parameters; and transmit the cell reselection parameters to the communication system to enable a base station of the communication system to perform a cell reselection based on the cell reselection parameters.

The first vector may represent a number of active user equipment (UEs) per cell, a cell load ratio, and the IP throughput per cell. The neural network may include an actor neural network and a critic neural network that are jointly trained based on proximal policy optimization (PPO).

While the afore described methods, devices, and non-transitory computer-readable mediums have been described individually, these descriptions are not intended to suggest any limitation as to the scope of use or functionality thereof. Indeed these methods, devices, and non-transitory computer-readable mediums may be combined in other aspects of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
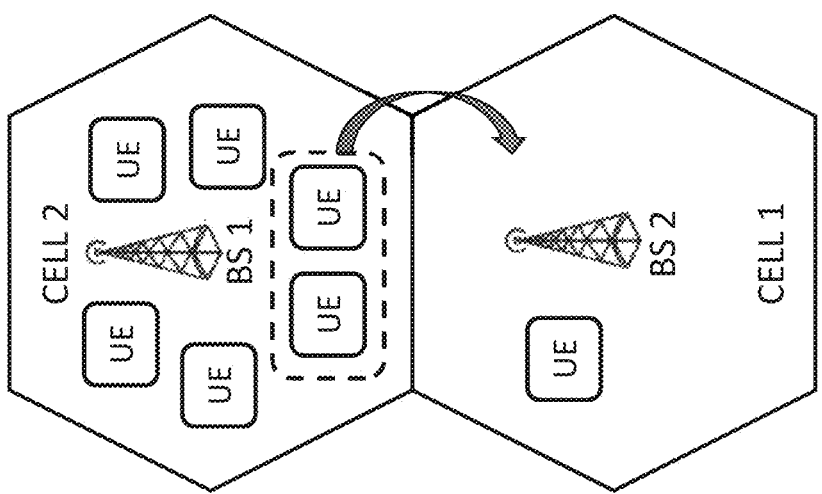
FIG. 1 illustrates a cell reselection process according to an example embodiment of the present disclosure.

One or more embodiments of the present disclosure provide a system, an apparatus, and a method for performing an artificial intelligence (AI)-based traffic load among different communication cells for idle mode UEs.

As the disclosure allows for various changes and numerous examples, the embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, each element described hereinafter may additionally perform some or all of functions performed by another element, in addition to main functions of itself, and some of the main functions of each element may be performed entirely by another component.

Further, in the present specification, a neural network is a representative example of an artificial intelligence model, but embodiments are not limited to an artificial intelligence model using an algorithm.

Furthermore, in the present specification, a "parameter" is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Throughout the disclosure, expressions such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

For convenience of description, the disclosure uses terms and names defined in a $3^{rd}$-Generation (3G) Partnership Project, that covers Long-Term Evolution (LTE) and related $4^{th}$-Generation (4G) standards, and $5^{th}$-Generation (5G) New Radio (NR) and related 5G standards. However, the disclosure is not be limited by the terms and names, and may be equally applied to a system that is based on another standard.

FIG. 1 illustrates a cell reselection process according to an example embodiment.

As shown in FIG. 1, a communication system includes at least one base station (BS), a communication network, and a plurality of user equipment (UEs) that access the communication network through the at least one BS.

The at least one BS may correspond to an Evolved Node B (eNB) or a 5G Node (gNB). The BS may collect status information of the UEs and may provide the UEs with access to the communication network based on the status information. Examples of the status information may include information of whether the UEs are in an active mode or an idle mode, and may also include a buffer status, an available transmission power status, and a channel status of each of the UEs.

Referring to FIG. 1, the communication system provides a first cell Cell 1 and a second cell Cell 2, that are served by a first base station, BS1, and a second base station, BS2, respectively. For example, when six (6) UEs are connected to Cell 1 and one (1) cell is connected to Cell 2, one or more UEs among the six UEs in Cell 2 are reassigned to Cell 1 to distribute communication traffic load between Cell 1 and Cell 2.

Specifically, in an LTE or 5G system, the first base station BS1 and the second base station B2 may communicate a cell reselection priority for each cell Cell 1 and Cell 2 to which the UEs should connect, through a radio resource control releasing message. The UEs may determine a target call on which to camp on based on the cell reselection priority. For each UE, the cell reselection process is performed as a probabilistic process based on the cell reselection priority. When Cell 1 has a high cell reselection priority, a given idle mode UE may have a high probability of being reselected to camp on Cell 1. The communication system may shift idle UEs from overloaded Cell 2 to less loaded Cell 1.

While FIG. 1 illustrates that each cell is served by the different base stations BS1 and BS2, the present embodiment is not limited thereto, and a single BS may serve a plurality of cells having different frequency bands.

For example, the first base station BS1 may serve the two different cells, Cell 1 and Cell 2, and may assign a higher cell selection priority to Cell 1 than to Cell 2, so that two idle UEs are reassigned from Cell 2 to Cell 1.

Figure 2:
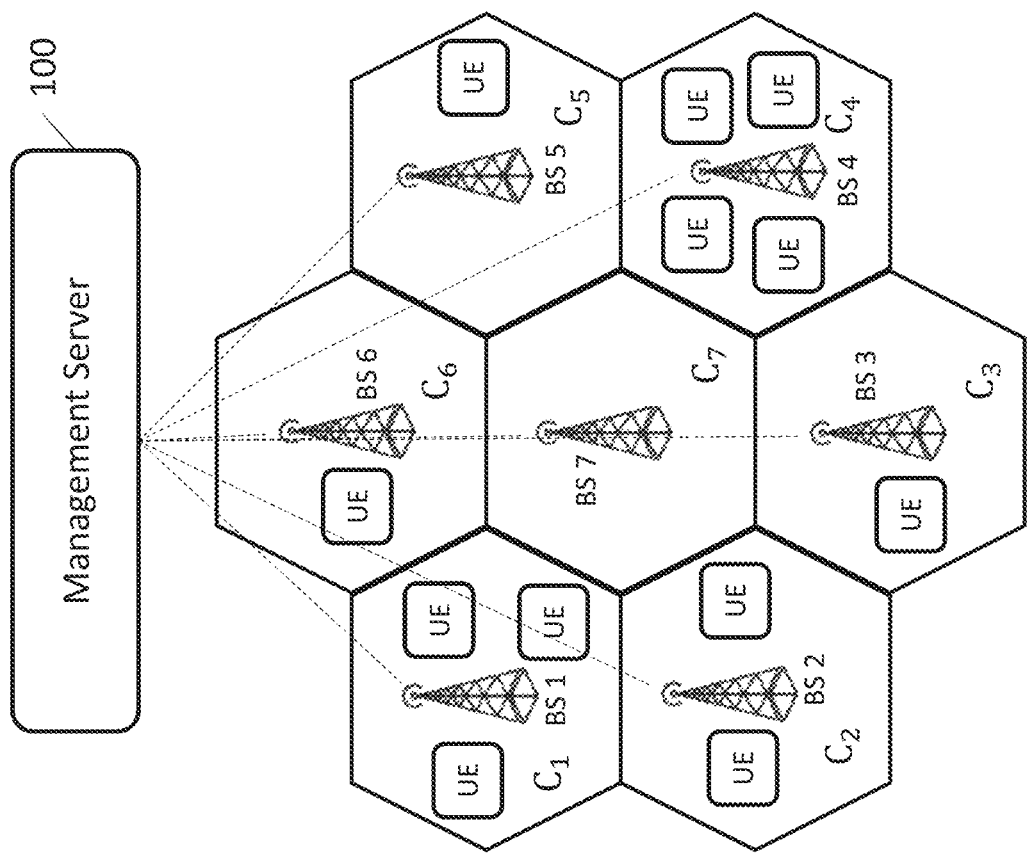
FIG. 2 illustrates a communication system for performing cell selection according to an example embodiment of the present application.

FIG. 2 illustrates a communication system for performing cell selection according to an example embodiment of the present application.

The communication system includes a management server 100, a plurality of base stations BS1-BS7 that serve a plurality of cells having different cell reselection priorities $\omega_1$-$\omega_7$, respectively, and a plurality of UEs that are respectively served in the plurality of cells $C_1$-$C_7$.

In an example embodiment, a single base station (e.g., BS1) may serve a plurality of cells $C_1$-$C_7$ having different frequency bands $f_1$-$f_7$ and different cell reselection priorities $\omega_1$-$\omega_7$.

The management server 100 may communicate with the plurality of base stations BS1-BS7 to receive information about the state of the UEs in their serving cells, for example, whether the UEs are in an idle mode or an active mode, the number of active UEs, and an internet protocol (IP) throughput of each cell.

The management server 100 may determine a cell reselection priority $\omega_1$-$\omega_7$ for each of the plurality of cells $C_1$-$C_7$ based on the information received from the plurality of base stations BS1-BS7. The management server 100 may transmit the cell reselection priorities $\omega_1$-$\omega_7$ to the plurality of base stations BS1-BS7, respectively. The plurality of base stations BS1-BS7 may forward the cell reselection priorities $\omega_1$-$\omega_7$ to the plurality of UEs in the idle mode so that some of the plurality of UEs in the idle mode are reassigned to another cell.

Figure 3:
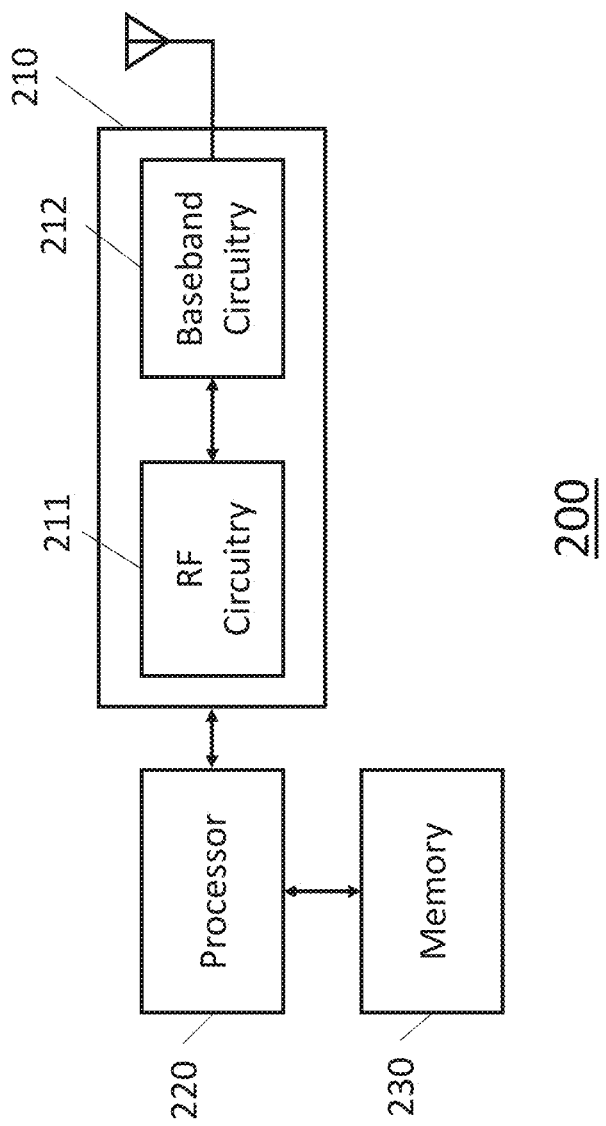
FIG. 3 illustrates the structure of a user equipment according to an example embodiment of the present disclosure.

FIG. 3 illustrates the structure of a user equipment according to an example embodiment.

Referring to FIG. 2, a user equipment (UE) 200 may include a transceiver 210, a processor 220, and a memory 230. The transceiver 210 may include a Radio Frequency (RF) circuitry 211 and a baseband circuitry 212.

The RF circuitry 211 may transmit and receive a signal through a wireless channel, and may perform band conversion and amplification on a transmittal or received signal. In particular, the RF circuitry 211 up-converts a baseband signal provided from the baseband circuitry 212 into an RF band signal, transmits the RF band signal through an antenna, and then down-converts the RF band signal received through the antenna into a baseband signal.

For example, the RF circuitry 211 may include a transmission filter, a reception filter, an amplifier, a mixer, an oscillator, a digital-to-analog convertor (DAC), an analog-to-digital convertor (ADC), and the like. Although only one antenna is illustrated in FIG. 3, the UE 200 may include a plurality of antennas.

The RF circuitry 211 may include a plurality of RF chains. Moreover, the RF circuitry 211 may perform beamforming. For the beamforming, the RF circuitry 211 may control a phase and a size of each signal transmitted/received through a plurality of antennas or antenna elements. The RF circuitry 211 may perform a Multi-Input Multi-Output (MIMO) operation and receive a plurality of beams when performing the MIMO operation.

The baseband circuitry 212 performs a conversion between a baseband signal and a bitstream according to a physical layer standard of the system. For example, when data is transmitted, the baseband circuitry 212 generates complex symbols by encoding and modulating a transmission bitstream. When data is received, the baseband circuitry 212 reconstructs a reception bitstream by demodulating and decoding a baseband signal provided from the RF circuitry 211.

The baseband circuitry 212 and/or the RF circuitry 211 may include a plurality of communication modules to support a plurality of different radio access technologies, such as for example, a Wireless Local Area Network (WLAN), and a cellular network (e.g., 4G, LTE, 5G, etc.).

The memory 230 stores computer-readable instructions, applications, and setting information for the operation of the UE 200. The memory 230 may store a cell reselection priority that is received from a base station, and may store information of a cell on which the UE 200 camps on, in the idle mode. The cell reselection priority is also referred to as a cell reselection parameter.

The processor 220 controls the overall operation of the UE 200. The processor 220 transmits and receives signals through the baseband circuitry 212 and the RF circuitry 211. The processor 220 stores data in the memory 230 and reads the data from the memory 230.

According to an embodiment of the disclosure, the UE 200 may receive measurement configuration information from the base station, perform cell measurement on the basis of the measurement configuration information, and report a result of the measurement to the base station.

Figure 4:
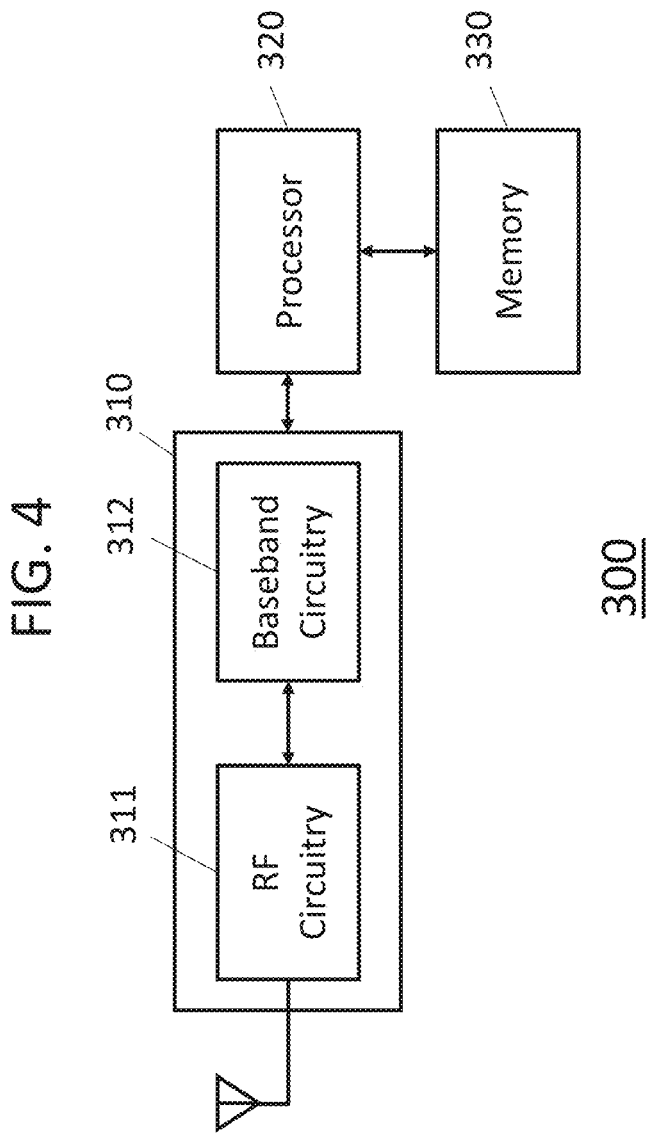
FIG. 4 illustrates the structure of a base station according to an example embodiment of the present disclosure.

FIG. 4 illustrates the structure of a base station according to an example embodiment.

Referring to FIG. 4, a base station 300 may include a transceiver 310, a processor 320, and a memory 330. The transceiver 310 includes an RF circuitry 311 and a baseband circuitry 312.

The baseband circuitry 312 may transmit and receive a signal through a wireless channel, and may perform band conversion and amplification on the signal. The RF circuitry 311 up-converts a baseband signal provided from the baseband circuitry 312 into an RF band signal and then transmits the converted signal through an antenna, and down-converts an RF band signal received through the antenna into a baseband signal. For example, the RF circuitry 311 may include a transmission filter, a reception filter, an amplifier, a mixer, an oscillator, a DAC, and an ADC.

The base station 300 may include a plurality of antennas. The RF circuitry 311 may include a plurality of RF chains and may perform beamforming. For the beamforming, the RF circuitry 311 may control a phase and a size of each of the signals transmitted and received through a plurality of antennas or antenna elements. The RF circuitry 311 may perform a downlink MIMO operation by transmitting one or more layers.

The baseband circuitry 312 may perform conversion between a baseband signal and a bitstream according to a physical layer standard of the radio access technology. For example, when data is transmitted, the baseband circuitry 312 generates complex symbols by encoding and modulating a transmission bitstream. When data is received, the baseband circuitry 312 reconstructs a reception bitstream by demodulating and decoding a baseband signal provided from the RF circuitry 311.

The memory 330 stores data computer-readable instructions, applications, and setting information for the operation of the base station 300. The memory 330 may store information on a bearer allocated to the accessed UE and the measurement result reported from the accessed UE.

The processor 320 controls the overall operation of the base station 300. The processor 320 transmits and receives signals through the baseband circuitry 312 and the RF circuitry 311. The processor 320 may record data in the memory 330 and read the data from the memory 330.

For example, the processor 320 may count the number of active UEs that are served by each cell, and may store information of the number of active UEs in the memory 330. The processor 320 may measure the cell load ratio and an internal protocol (IP) throughput per cell, and may store information of the cell load ratio and the IP throughput in the memory 300. When the base station 300 serves a plurality of cells, the processor 320 may count the number of active UEs, the cell load ratio, and the IP throughput for each of the plurality of cells.

The processor 320 may control the transceiver 310 to transmit the information of the number of active UEs, the cell load ratio, and the IP throughput per cell, to the management server 100, based on a request from the management server 100.

Figure 5:
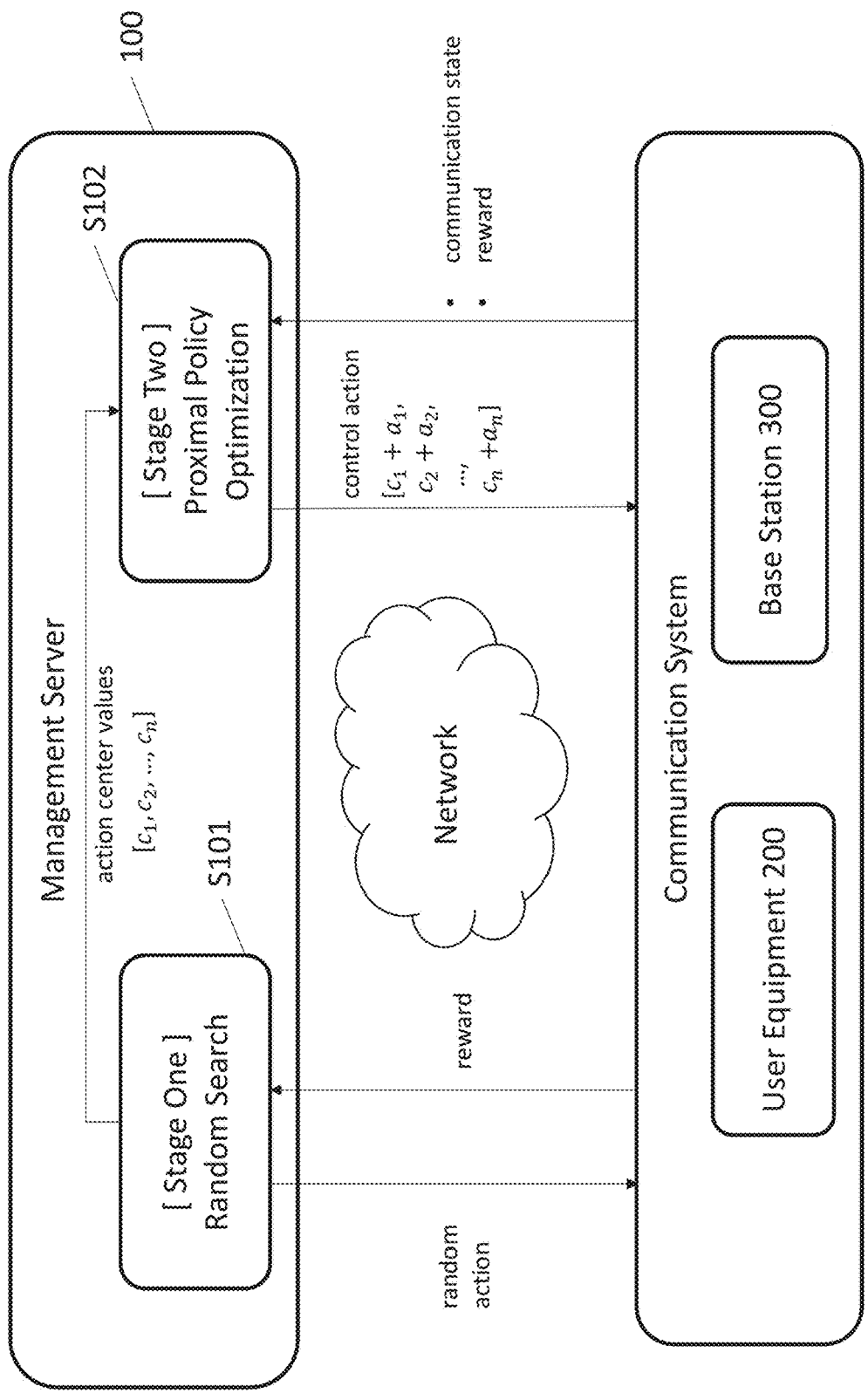
FIG. 5 illustrates a procedure in which a management server determines cell reselection parameters with interaction with a communication system, according to an example embodiment of the present disclosure.

FIG. 5 illustrates a procedure in which a management server determines cell reselection parameters with interaction with a communication system, according to an example embodiment of the present disclosure.

As shown in FIG. 5, the management server 100 may perform a random search in operation S101, and may perform a proximal policy optimization in operation S102 with communication with at least one base station 300 included in the communication system.

In operation S101, the management server 100 may randomly sample cell reselection parameters (hereinafter, referred to as "random cell reselection parameters"), and select, from the random cell reselection parameters, a cell reselection parameter set, c=[$c_1$, $c_2$, ... $c_n$] that allows the communication system to provide the highest communication performance, wherein n denotes a natural number higher than 2.

In particular, the management server 100 may transmit the random cell reselection parameters to the at least one base station 300, as a random action, to enable the base station 300 to perform a cell reselection process according to the random cell reselection parameters.

After or while performing the cell reselection process according to the random cell reselection parameters, the base station 300 may transmit to the management server 100, a reward function that indicates the standard deviation of the time-averaged IP throughput of a plurality of cells served by the base station 300.

The management server 100 may determine the cell reselection parameter set, c=[$c_1$, $c_2$, ... $c_n$], as action center values, based on the standard deviation of the time-averaged IP throughput of the plurality of cells.

In operation S102, the management server 100 may perform a reinforcement learning algorithm, based on the action center values c=[$c_1$, $c_2$, ... $c_n$] that are obtained in operation S101, to learn a control policy that maximizes its long-term expected reward (e.g., the standard deviation of the time-averaged IP throughput of all the serving cells), and thus improve the load distribution between the different serving cells. For example, the management server 100 may use a proximal policy optimization, as the reinforcement learning algorithm, to find an optimal control policy.

The management server 100 may update cell reselection parameters that are applicable at the communication state of the communication system, based on a clipped surrogate objective function. The clipped surrogate objective function may represent an expected minimum value of a probability that previous cell reselection parameters of the communication system are updated to the new cell reselection parameters.

For example, in operation S102, the management server 100 may obtain offset values, a=[$a_1$, $a_2$, ... $a_n$] at operation time t, based on a clipped surrogate objective function, $L^{CLIP}(\theta)$, which is expressed as follows:

$$L^{CLIP}(\theta)=E_t[\min(r_t(\theta)\hat{A}_t, \text{clip}(r_t(\theta), 1-\epsilon, 1+\epsilon)\hat{A}_t)] \qquad \text{EQN. (1)}$$

wherein $r_t(\theta)$ denotes a probability ratio that is expressed as:

$$r_t(\theta) = \frac{\pi_\theta(a_t \mid s_t)}{\pi_{\theta'}(a_t \mid s_t)} \qquad \text{EQN. (2)}$$

Wherein $\pi_{\theta'}$ denotes an old policy that is applied at operation time t−1, $\pi_\theta$ denotes a new policy that is to be applied at operation time t, $\epsilon$ denotes a preset value less than 1, which is used to avoid large policy updates (i.e., policy collapse), $\hat{A}_t$ denotes an estimator of an advantage function at operation time t, and $E_t[\bullet]$ denotes an expectation value of a variable (i.e., the estimated advantage function) of the expectation function, at operation time t.

In an example embodiment, the management server 100 may perform the proximal policy optimization based on the clipped surrogate objective function $L^{CLIP}(\theta)$, and therefore may prevent large policy updates that may deteriorate the performance of the reinforcement learning, unlike a comparative example in which the following objective function is used:

$$L^{PG}(\theta)=E_t[\log \pi_\theta(a_t \mid s_t)\hat{A}_t] \qquad \text{EQN. (3)}$$

Using the surrogate clipped objective function and performing a gradient update on sampled data, the proximate policy optimization according to the embodiment of the present disclosure may achieve better data efficiency and stability compared with standard policy gradient algorithms.

For example, the management server 100 may use the following pseudo code to perform the proximal policy optimization:

TABLE 1

Algorithm 1 PPO: Proximal Policy Gradient-based Load Balancing

Input: Initial policy parameters $\theta_0$, initial value function parameters $\phi_0$.
1: for k = 1, ... do
2:     Collect a set of trajectories $\mathcal{D}_k = \{\tau_i\}$ by running the policy $\pi_k = \pi(\theta_k)$
3:     Compute the reward $\hat{R}_t$
4:     Compute the advantage function $\hat{A}_t$
5:     Update the policy parameter with the clipped surrogate objective function $L^{CLIP}$ shown in Equation 2.
6:     Update $\phi_{k+1}$ with $\frac{1}{|\mathcal{D}_k|T}\sum_{\tau \in \mathcal{D}_k}\sum_{t=0}^{T}(V_\phi(s_t)-\hat{R}_t)^2$
7: end for The management server 100 makes an intermediate control decision a=arg $\max_a \pi_T(a|s)$ at each time step, based on the observations s of the communication system, wherein the observations s may include information of a communication state and a reward that are obtained through interaction with the base station 300.

For example, the communication state may be represented as a vector that encompasses the number of connected active UEs per cell, the cell load ratio and the IP throughput per cell. The reward may be represented as the standard deviation of the time-averaged IP throughput of the plurality of cells (or all the cells on which the UEs are capable to camp).

The management server 100 may use the following pseudo to apply the learned control policy $\pi_T$ in the inference phase:

TABLE 2

Algorithm 2 Application Phase

Input: Learned control policy $\pi_T$, selected action c.
1.: for each time step in communication system do
2:     Choose an action a with the maximal probability determined by $\pi_T(\bullet|s, \phi)$
3:     Take action a + c, observe state s, and receive a reward r.
4: end for The management server 100 obtains a sum [$c_1+a_1$, $c_2+a_2$, ... $c_n+a_n$] of the action center values c=[$c_1$, $c_2$, ... $c_n$] and the offset values, a=[$a_1$, $a_2$, ... $a_n$], and transmits the sum [$c_1+a_1$, $c_2+a_2$, ... $c_n+a_n$] to the communication system, as cell reselection parameters. The management server 100 continues to observe the communication state and the reward through interaction with the communication system, and may update the offset values and the sum according to the new observations.

Figure 6:
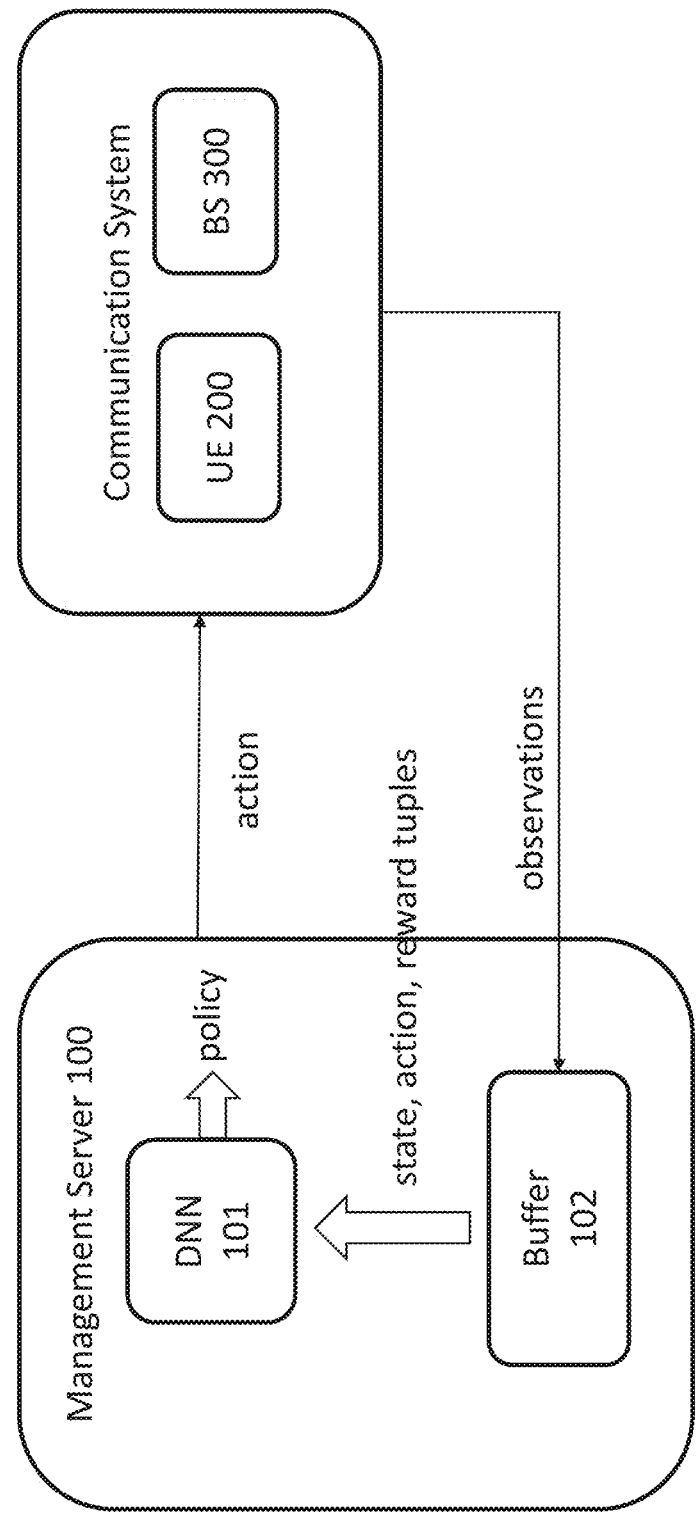
FIG. 6 illustrates the structure of the management server according to an example embodiment of the present disclosure.

FIG. 6 illustrates the structure of the management server according to an example embodiment of the present disclosure.

The management server 100 may use one or more deep neural networks (DNN) 101 to accept observations of the communication system as input, and output a control policy by processing the observations. The control policy may refer to an action that is to be taken at a certain communication state, and the action may refer to a cell reselection parameter to be assigned to each cell. The DNNs 101 may perform reinforcement learning to provide the control policy including cell reselection parameters.

The DNNs 100 may include a pair of an actor neural network and a critic neural network that have separate structures and do not share features each other, or may include an integrated actor-critic neural network that are interconnected with each other to share features.

The actor neural network and the critic neural network may be jointly trained based on proximal policy optimization (PPO).

The DNNs 100 may include convolutional layers and fully connected layers. The convolution layers may perform a linear operation that involves multiplication of a set of weights with the input data, and a sum of the products of the multiplications. For example, the multiplication may be performed between an array of the input data and an array of the weight. The array of the weight may be referred to as a filter or a kernel, and may be stored in the management server 100.

The fully connected layers may include a plurality of layers, in which each neuron in one layer is connected to all neurons in the next layer. In the forward pass, the convolutional layers and the fully connected layers may process the state, action, and reward tuple, and output the offset values $a=[a_1, a_2, \ldots a_n]$ to be added to the action center values $c=[c_1, c_2, \ldots c_n]$.

The management server 100 may include a buffer 102 that stores the observations of the communication system, in connection with the action that was taken to obtain the state and the reward from the communication system according to the action. The buffer 102 may store the communication state, the standard deviation of the IP throughput, and the cell reselection parameters as a state-action-reward tuple, at each operation time, and may provide the state-action-reward tuple to the DNNs 101, so that the DNNs 101 output a control policy indicating an action that should be taken at the current communication state.

The action may be represented as the offset values, $a=[a_1, a_2, \ldots a_n]$, and the management server 100 may add the offset values, $a=[a_1, a_2, \ldots a_n]$ to the action center values $c=[c_1, c_2, \ldots c_n]$ to obtain the sum $[c_1+a_1, c_2+a_2, \ldots c_n+a_n]$ as a cell reselection parameter. The management server 100 may transmit the cell reselection parameter to the communication system so that the base station 300 performs a cell reselection process according to the cell reselection parameter.

Figure 7:
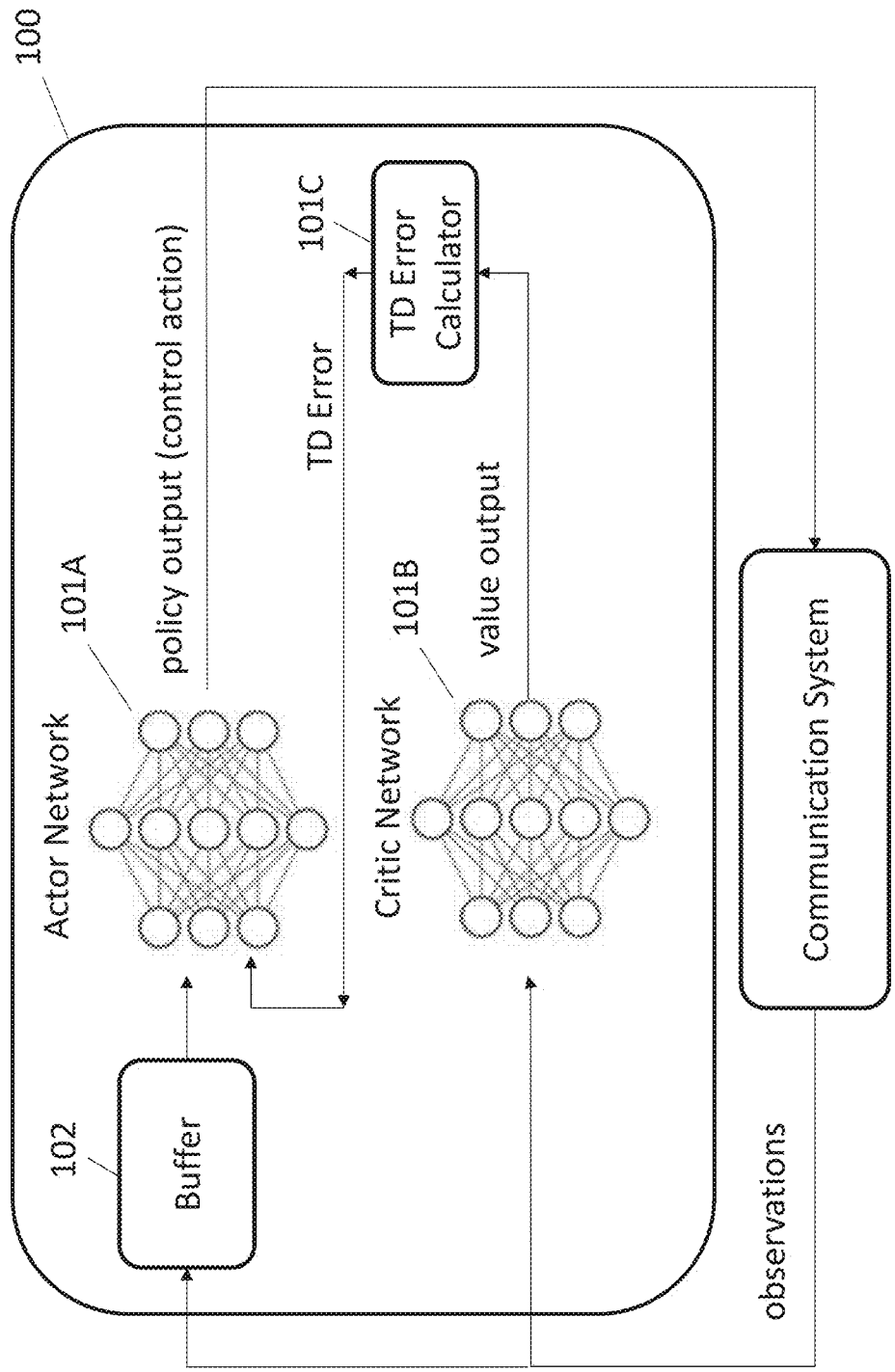
FIG. 7 illustrates the structure of a deep neural network shown in FIG. 6, according to an example embodiment of the present application.

FIG. 7 illustrates the structure of the DNN of FIG. 6, according to an example embodiment of the present application.

Referring to FIG. 7, the DNN 101 of FIG. 6 may include an actor neural network 101A, a critic neural network 101B, and a temporal difference (TD) calculator 101C.

The actor neural network 101A may receive a TD error from the critic neural network 101B, in addition to the state, action and reward tuple that is received from the buffer 102.

The critical network 101B evaluates the action determined by the action neural network 101A, based on the communication state (e.g., the number of active UEs per cell, a cell load ratio, and the IP throughput per cell) and the reward (e.g., the standard deviation of the IP throughput of the plurality of communication cells) that are obtained from the communication system according to the action.

In particular, the critical network 101B outputs a first value function $V(s_t)$ based on a first communication state $s_t$ and a first reward $r_t$ at an operation time t at which a first action $a_t$ was taken, and outputs a second value function $V(s_{t+1})$ based on a second communication state $s_{t+1}$ and a second reward $r_{t+1}$ at an operation time t+1 at which a second action $a_{t+1}$ was taken.

The TD error calculator 101C compares the first value function $V(s_t)$ and the second value function $V(s_{t+1})$. For example, the TD error calculator 101C may calculate the TD error as follows:

$$TD\ error = r_{t+1} + \gamma V(s_{t+1}) - V(s_t) \quad (4)$$

The actor neural network 101A may increase the tendency to select the second action $a_{t+1}$ when the TD error has a positive value, and may decrease the tendency to select the second action $a_{t+1}$ when the TD error has a negative value.

The actor neural network 101A may determine a control policy indicating an action to be taken at the current communication state, based on the TD received from the TD error calculator 101C, as well as the state, action and reward tuple that is received from the buffer 102. Here, the action refers to a cell reselection parameter to be transmitted to the communication system, so that the base station of the communication system takes the action of the cell reselection according to the cell reselection parameter determined by the actor neural network 101A.

The management server 100 may repeat the above mentioned operations to update the control policy.

Figure 8:
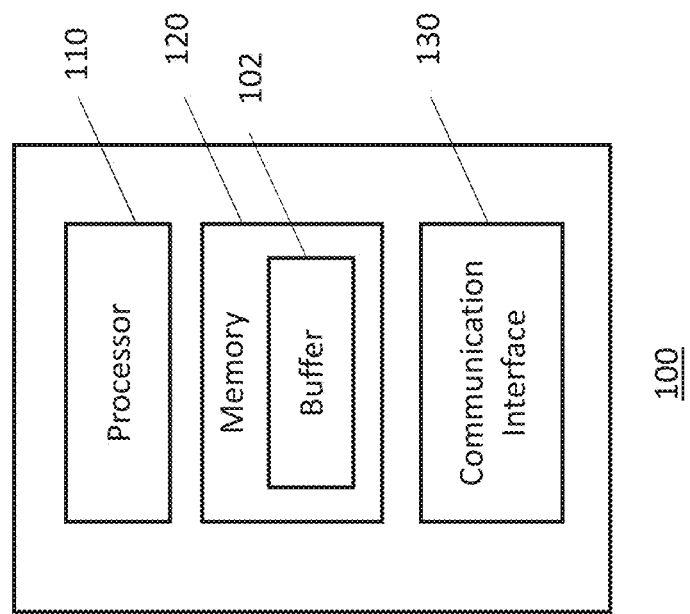
FIG. 8 is a diagram illustrating a hardware structure of the management server according to an example embodiment.

FIG. 8 is a diagram illustrating a hardware structure of the management server according to an example embodiment.

As shown in FIG. 8, the management server 100 may include a processor 110, a memory 120 including the buffer 102, and a communication interface 130.

The processor 110 is implemented in hardware, firmware, or a combination of hardware and software. The processor may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor includes one or more processors capable of being programmed to perform a function. The processor may access the memory and execute computer readable program instructions that are stored in the memory.

The memory 120 stores information, data, an operating system, a plurality of program modules software related to the operation and use of the trajectory estimating system. For example, the memory may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The memory 120 may store neural network parameters (e.g., weights, biases, network topologies, network connection information, etc.) for the actor neural network 101A and the critic neural network 101B, and may store program instructions and codes configured to be executed by the processor 110 to output control actions through the operation of for the actor neural network 101A and the critic neural network 101B.

The memory 120 may also include the buffer 102 that stores the observations of the communication system, in connection with the action that was taken to obtain the state and the reward from the communication system according to the action. The buffer 102 stores the state, the action and the reward as a tuple, at each operation time, and provides the state, action, and reward tuple to the DNNs 101, so that the DNNs 101 output a control policy indicating an action that should be taken at the current communication state.

The communication interface 130 may enable communications between the management server 100 and the base stations 200 in the communication system. The communication interface 130 may include a transceiver and/or a separate receiver and transmitter that enables the management server 100 to communicate with other devices, such as via a wired connection, a wireless connection, or a combination of wired and wireless connections. The communication interface 130 may permit the management server 100 to receive information from another device and/or provide information to another device. For example, the communication interface 130 may include an Ethernet interface, an optical interface, a coaxial interface, an infrared interface, a radio frequency (RF) interface, a universal serial bus (USB) interface, a Wi-Fi interface, a cellular network interface, or the like.

Figure 9:
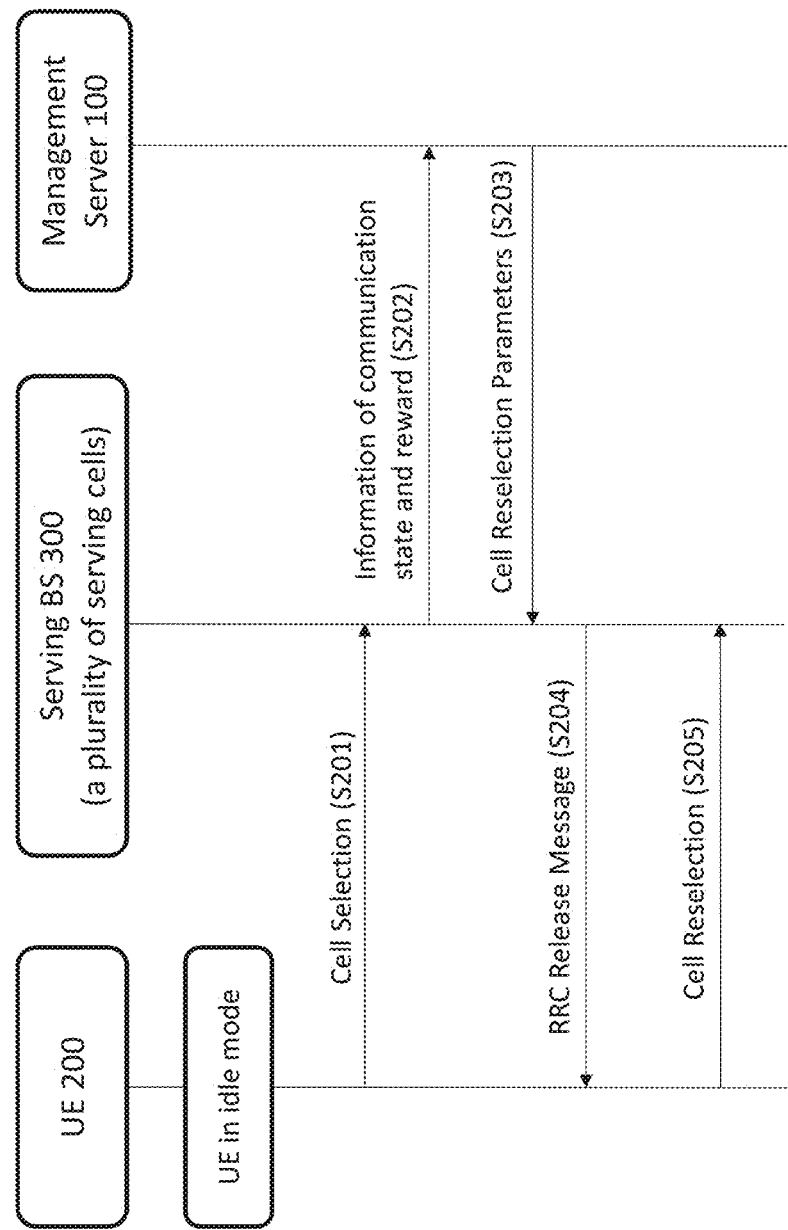
FIG. 9 illustrates a method of communicating with a UE and a BS to perform a cell reselection process according to an example embodiment.

FIG. 9 illustrates a method of communicating with a UE and a BS to perform a cell reselection process according to an example embodiment.

As shown in FIG. 9, the UE 200 in an idle mode may perform an initial cell selection in operation S201. In order to select an initial cell, the UE 200 may scan all radio frequency (RF) channels in its operating frequency bands and may select an initial cell for the UE to camp on, based on cell selection criterion. For example, the UE 200 may select the initial cell based on various parameters, such as for example, a cell selection reception (RX) level value (Srxlev), a cell selection quality value (Squal), an offset temporarily applied to a cell (Qoffsettemp), a measured cell reception level value (Qqualmeas), a measured cell quality value (Qrxlevmeas), a minimum required RX level in the cell (Qrxlevmin), a minimum required quality level in the cell (Qqualmin). The UE 200 transmits information of the selected initial cell to a base station 300 that manages a plurality of cells, so that the UE 200 in the idle mode camps on the selected initial cell among the plurality of cells.

In operation S202, the base station 300 may transmit information of the communication state, including the number of active mode UEs per cell, the cell load ratio, and the IP throughput per cell, to the management server 100. The base station 300 may also transmit information of the reward, for example, such as the standard deviation of the time-averaged IP throughput of the plurality of cells.

In operation S203, the management server 100 may determine cell reselection parameters using the actor neural network 101A and the critical neural network 101B, based on the information of the communication state and the reward, and may transmit the cell reselection parameters to the base station 300. The cell reselection parameters may correspond to cell reselection priorities $\omega_1$-$\omega_7$ that are assigned to the plurality of cells $C_1$-$C_7$ shown in FIG. 2.

In operation S204, the base station 300 may transmit a Radio Resource Control (RRC) Release message including the cell reselection parameters, to the UE 200.

In operation S205, the UE 200 then may select a target cell on which to camp on based on the cell reselection parameters, and may send information of the selected target cell to the base station 300. For example, when a second cell $C_2$ has a higher cell reselection priority $\omega_2$ than the other neighboring cells, $C_1$ and $C_3$-$C_7$, among the plurality of cells $C_1$-$C_7$, the idle mode UE 200 has a higher probability of being re-assigned to camp on the second cell $C_2$ than other neighboring cells, $C_1$ and $C_3$-$C_7$.

Figure 10:
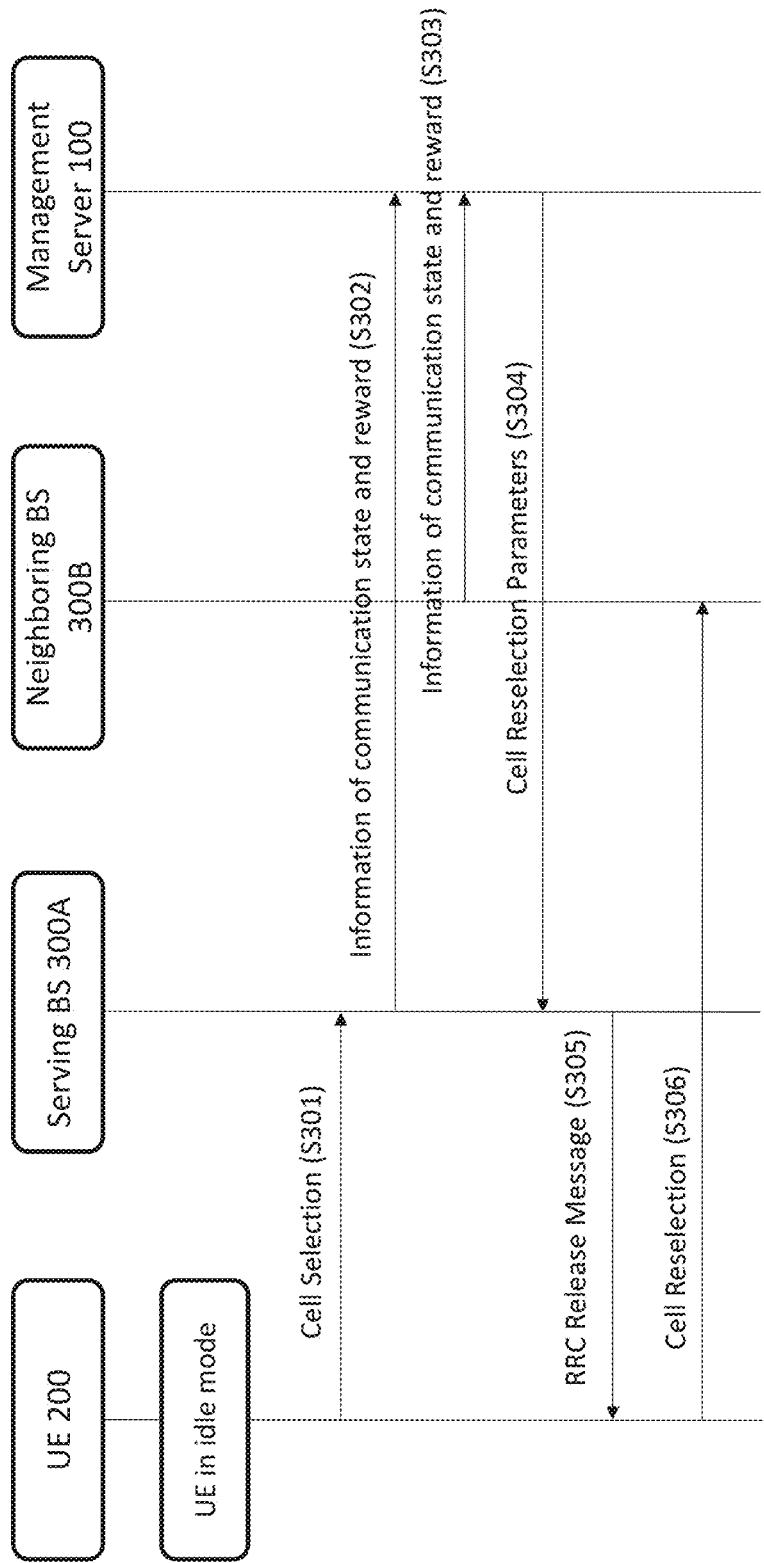
FIG. 10 illustrates a method of communication with an UE and a BS to perform a cell reselection process according to another example embodiment.

FIG. 10 illustrates a method of communication with an UE and a BS to perform a cell reselection process according to another example embodiment.

With reference to FIG. 10, the UE 200 in an idle mode may perform an initial cell selection in operation S301. In order to select an initial cell, the UE 200 may scan all radio frequency (RF) channels in its operating frequency bands and may select an initial cell for the UE to camp on, based on cell selection criterion. The UE 200 may transmit information of the selected initial cell to its serving base station 300A, to camp on the selected initial cell of the serving base station 300A.

In operations S302 and S303, each of the serving base station 300A and a neighboring base station 300B may transmit information of the communication state, including the number of active mode UEs per cell, the cell load ratio, and the IP throughput per cell, to the management server 100. The serving base station 300A and the neighboring base station 300B may also transmit information of the reward, for example, such as the standard deviation of the time-averaged IP throughput of the plurality of cells.

In operation S304, the management server 100 may determine cell reselection parameters using the actor neural network 101A and the critical neural network 101B, based on the information of the communication state and the reward, and may transmit the cell reselection parameters to the serving base station 300. The cell reselection parameters may correspond to cell reselection priorities $\omega_1$-$\omega_7$ that are assigned to the plurality of cells $C_1$-$C_7$ shown in FIG. 2.

In operation S305, the serving base station 300A may transmit an RRC Release message including the cell reselection parameters, to the UE 200.

In operation S306, the UE 200 then may select a target cell on which the UE 200 is to camp on based on the cell reselection parameters, wherein the target cell is served by the neighboring base station 300B. The UE 200 may send information of the selected target cell to the neighboring base station 300B to camp thereon. For example, when a second cell $C_2$ is served by the neighboring base station 300B and has a higher cell reselection priority $\omega_2$ than other cells $C_1$ and $C_3$-$C_7$, the idle mode UE 200 has a higher probability of being re-assigned to camp on the second cell $C_2$ than other cells $C_1$ and $C_3$-$C_7$.

According to the embodiments of the present application, the management server 100 uses a two-stage process including: a coarse-grained method for finding action center values based on a random search; and a fine-grained method for finding offset values to be added to the action center values, based on proximate policy optimization, and thereby improves the communication traffic load distribution between different cells.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An apparatus for distributing communication load over a plurality of communication cells included in a communication system, the apparatus comprising:
a memory storing instructions; and
a processor configured to execute the instructions to:
select action centers from random cell reselection values, based on a standard deviation of an internet protocol (IP) throughput over the plurality of communication cells;
input a first vector indicating a communication state of the communication system and a second vector indicating the standard deviation of the IP throughput of the plurality of communication cells, to a neural network to output a sum of the action centers and offsets as cell reselection parameters; and
transmit the cell reselection parameters to the communication system to enable a base station of the communication system to perform a cell reselection based on the cell reselection parameters,
wherein the neural network comprises an actor neural network and a critic neural network that are jointly trained based on proximal policy optimization (PPO),
wherein the critic neural network is configured to evaluate the cell reselection parameters based on the communication state and the standard deviation of the IP throughput, and output a value function representing a result of evaluating the cell reselection parameters to the actor neural network, and
the actor neural network is configured to determine the offsets based on the value function.

2. The apparatus of claim 1, wherein the first vector represents a number of active user equipment (UEs) per cell, a cell load ratio, and the IP throughput per cell.

3. The apparatus of claim 2, further comprising:
a communication interface configured to receive information of the number of active equipment (UEs) per cell, the cell load ratio, and the IP throughput per cell, from the base station of the communication system, and transmit the cell reselection parameters to the base station.

4. The apparatus of claim 1, further comprising a buffer configured to store the communication state, the standard deviation of the IP throughput, and the cell reselection parameters as a state-action-reward tuple, and provide the state-action-reward tuple to the actor neural network.

5. The apparatus of claim 1, wherein at each time step of an application phase of the neural network, the processor is further configured to determine an intermediate action that maximizes a probability of taking the intermediate action at the communication state of the communication system, and
wherein the intermediate action corresponds to the cell reselection parameters at each time step.

6. The apparatus of claim 1, wherein the processor is further configured to update a policy parameter indicating the cell reselection parameters that are applicable at the communication state of the communication system, based on a clipped surrogate objective function.

7. The apparatus of claim 6, wherein the cell reselection parameters that are transmitted to the communication system correspond to new cell reselection parameters, and
wherein the clipped surrogate objective function represents an expected minimum value of a probability that previous cell reselection parameters of the communication system are updated to the new cell reselection parameters.

8. A method of distributing communication load over a plurality of communication cells included in a communication system, the method comprising:
selecting action centers from random cell reselection values, based on a standard deviation of an internet protocol (IP) throughput over the plurality of communication cells;
inputting a first vector indicating a communication state of the communication system and a second vector indicating the standard deviation of the IP throughput of the plurality of communication cells, to a neural network to output a sum of the action centers and offsets as cell reselection parameters; and
transmitting the cell reselection parameters to the communication system to enable a base station of the communication system to perform a cell reselection based on the cell reselection parameters,
wherein the neural network comprises an actor neural network and a critic neural network that are jointly trained based on proximal policy optimization (PPO),
wherein the critic neural network is configured to evaluate the cell reselection parameters based on the communication state and the standard deviation of the IP throughput, and output a value function representing a result of evaluating the cell reselection parameters to the actor neural network, and
the actor neural network is configured to determine the offsets based on the value function.

9. The method of claim 8, wherein the first vector represents a number of active user equipment (UEs) per cell, a cell load ratio, and the IP throughput per cell.

10. The method of claim 9, further comprising:
receiving information of the number of active equipment (UEs) per cell, the cell load ratio, and the IP throughput per cell, from the base station of the communication system; and
transmitting the cell reselection parameters to the base station.

11. The method of claim 8, further comprising:
storing the communication state, the standard deviation of the IP throughput, and the cell reselection parameters as a state-action-reward tuple, on a buffer; and
providing the state-action-reward tuple from the buffer to the actor neural network.

12. The method of claim 8, further comprising:
at each time step of an application phase of the neural network, determining an intermediate action that maximizes a probability of taking the intermediate action at the communication state of the communication system, and
wherein the intermediate action corresponds to the cell reselection parameters at each time step.

13. The method of claim 8, further comprising updating a policy parameter indicating the cell reselection parameters that are applicable at the communication state of the communication system, based on a clipped surrogate objective function.

14. The method of claim 13, wherein the cell reselection parameters are new cell reselection parameters, and
wherein the clipped surrogate objective function represents an expected minimum value of a probability that previous cell reselection parameters of the communication system are updated to the new cell reselection parameters.

15. A non-transitory computer-readable storage medium storing a program that is executable by at least one processor to:
- select action centers from random cell reselection values, based on a standard deviation of an internet protocol (IP) throughput over a plurality of communication cells that are included in a communication system;
- input a first vector indicating a communication state of the communication system and a second vector indicating the standard deviation of the IP throughput of the plurality of communication cells, to a neural network to output a sum of the action centers and offsets as cell reselection parameters; and
- transmit the cell reselection parameters to the communication system to enable a base station of the communication system to perform a cell reselection based on the cell reselection parameters,
- wherein the neural network comprises an actor neural network and a critic neural network that are jointly trained based on proximal policy optimization (PPO),
- wherein the critic neural network is configured to evaluate the cell reselection parameters based on the communication state and the standard deviation of the IP throughput, and output a value function representing a result of evaluating the cell reselection parameters to the actor neural network, and
- the actor neural network is configured to determine the offsets based on the value function.

16. The non-transitory computer-readable storage medium of claim 15, wherein the first vector represents a number of active user equipment (UEs) per cell, a cell load ratio, and the IP throughput per cell.

* * * * *